United States Patent Office 3,536,512
Patented Oct. 27, 1970

3,536,512
PROCESS FOR AFTERTREATING CARBON BLACK
Hugh J. Deery, Jr., Jamaica Plain, Mass., assignor to Cabot Corporation, Boston, Mass., a corporation of Delaware
Filed Aug. 2, 1968, Ser. No. 749,766
Int. Cl. C09c 1/56
U.S. Cl. 106—307        12 Claims

ABSTRACT OF THE DISCLOSURE

The present invention provides an improved method for eliminating free acid residues normally present on carbon blacks which have been treated with oxidizing mineral acids. Said method broadly comprises the contacting of such acid treated blacks with ammonia. Said technique eliminates said free acid residues much more simply and effectively than techniques heretofore commonly employed in the art and, moreover, can result in significantly improved rubber reinforcement properties of the product black.

---

The treatment of carbon blacks with oxidizing mineral acids is a well known process whereby desirable properties are imparted to subject blacks. For instances, furnace blacks are often treated with such oxidizing acids in order to reduce scorching tendency or to obtain slower curing rubber stocks when ultimately incorporated into a curable rubber composition. Channel or impingement blacks, on the other hand, are often treated with an oxidizing acid in order to improve their flow or color properties when subsequently utilized in ink or paint applications.

At the outset it should be noted that, for the purposes of the present specification and claims the term "oxidizing mineral acid" refers to any oxygen containing mineral acid such as nitric acid, nitrous acid, sulfuric acid, sulfurous acid, hypochlorous acid, etc. and, in addition, to the corresponding acid anhydrides thereof. Accordingly, compounds such as nitrogen dioxide, nitrogen tetroxide, sulfur trioxide, sulfur dioxide and the like, all of which compounds are anhydrous analogues of corresponding oxidizing mineral acids, are also specifically contemplated as being suitable oxidizing mineral acids within the scope of the present invention. Nitric acid and its corresponding anhydrides have been found to be exceptionally well suited to the task of oxidative treatment of carbon blacks; accordingly, these acids are normally to be preferred. Further, the acid anhydrides are often preferred treating reagents because they offer the process advantage of not requiring a normally expensive and time consuming water removal step subsequent to the treatment step.

Generally speaking, the oxidizing mineral acid treatment of blacks is achieved by contacting the black in pelleted or fluffy form with the oxidizing acid at elevated temperatures, i.e. at above about 200° F., and maintaining the thusly contacted black in a heated environment for a period of time sufficient to produce the desired effect. Said treatment is generally considered to result in a surface oxidation of the black which, in turn, is signalled by an increase in the volatile content thereof. Said volatile content is generally held to constitute a quantitative measurement of the chemisorbed oxygen on the surface of the black and thus, the extent of oxidation of a particular black/acid combination is normally roughly proportional to the extent of increase realized in said volatile content. When furnace blacks are treated in order to imaprt improved rubber scorch properties thereto only a minor oxidation is generally required, i.e. sufficient treatment to provide up to about 2% volatile content on the black. On the other hand, when furnace blacks are to be treated in order to lengthen the rubber curing time thereof or to provide long flow properties thereto the target volatile content in the acid treatment step is normally between about 3 and about 5% by weight of the black. For various other applications and purposes, such as in the production of medium flow channel blacks, the oxidizing acid treatment is normally carried out to the extent that the volatile content of the black is raised to between about 2 and about 3%; while for long flow channel blacks the treatment is sufficiently stringent to provide up to about 15% volatile or even higher. Thus, it is readily apparent that the treatment of carbon blacks with oxidizing mineral acids is a quite flexible process which can be employed to impart specific properties to a given black and thus especially befit that black for a particular end use. The process of the present invention, however, is applicable to any of the many specific permutations of the generalized oxidizing mineral acid treatment process outlined hereinabove.

In any case, following the oxidizing mineral acid treating step, the product black is generally heated to and maintained at a substantially higher temperature than utilized in said treatment step in order to volatilize and remove unreacted acid residues and other by-products from the black. Often, this desorption or "degassing" process is accomplished within the same apparatus as utilized for the mineral acid treatment and there is also normally associated with said degassing step a substantial air or flue gas purge in order to aid the desorption and to carry said volatilized residues and by-products from the vicinity of the black and thereby avoid, as much as possible, the likelihood of readsorption and/or recondensation of said by-products on the black. When nitric acid and/or its anhydrous analogues are utilized for the acid treatment step the temperatures normally utilized for the purging or degassing step are generally in the range of from about 300° F. to about 500° F. Subsequent to the degassing step the black is cooled and thereafter utilized in its intended end use application. A more detailed understanding of various oxidizing mineral acid treatment processes of carbon black can be had by reference to the following patent literature: U.S. 2,420,810, Bray et al., May 20, 1947; U.S. 2,516,233, McKinnis, July 25, 1950; U.S. 2,641,535, Cines, June 9, 1953; U.S. 2,657,117, Sperberg, Oct. 28, 1953; U.S. 2,686,107, Jordan, Aug. 10, 1954; U.S. 3,023,118, Donnet, Feb. 17, 1962 and U.S. 3,226,244, Jordan et al. Dec. 28, 1965.

One of the problems heretofore associated with the oxidizing mineral acid treatment of carbon blacks resides in the continued presence of free acid residues on the black subsequent to the purging step. Said residues have often resulted in problems of storage of the black, such as fires caused by spontaneous combustion thereof. Also, said free acid residues are often released in subsequent processing equipment thereby causing corrosion problems as well as constituting a serious health hazard to personnel. For instance, when nitric acid treated blacks produced by way of prior art methods are dispersed in inks or polymeric materials such as rubber, polyolefins and the like wherein substantial heat is generated either during dispersion and/or subsequent forming operations it has often been found that nitric acid residues present on the black tend to desorb and enter the surrounding environment. This deleterious phenomenon can generally be detected by a nitric oxide odor surrounding the work zone; however, said problem has occasionally been so acute as to be detectable visually by the emanation of reddish brown nitric oxide vapors into the environment. As mentioned hereinbefore, the general prior art method for removing free acid residues from the black comprises heating the

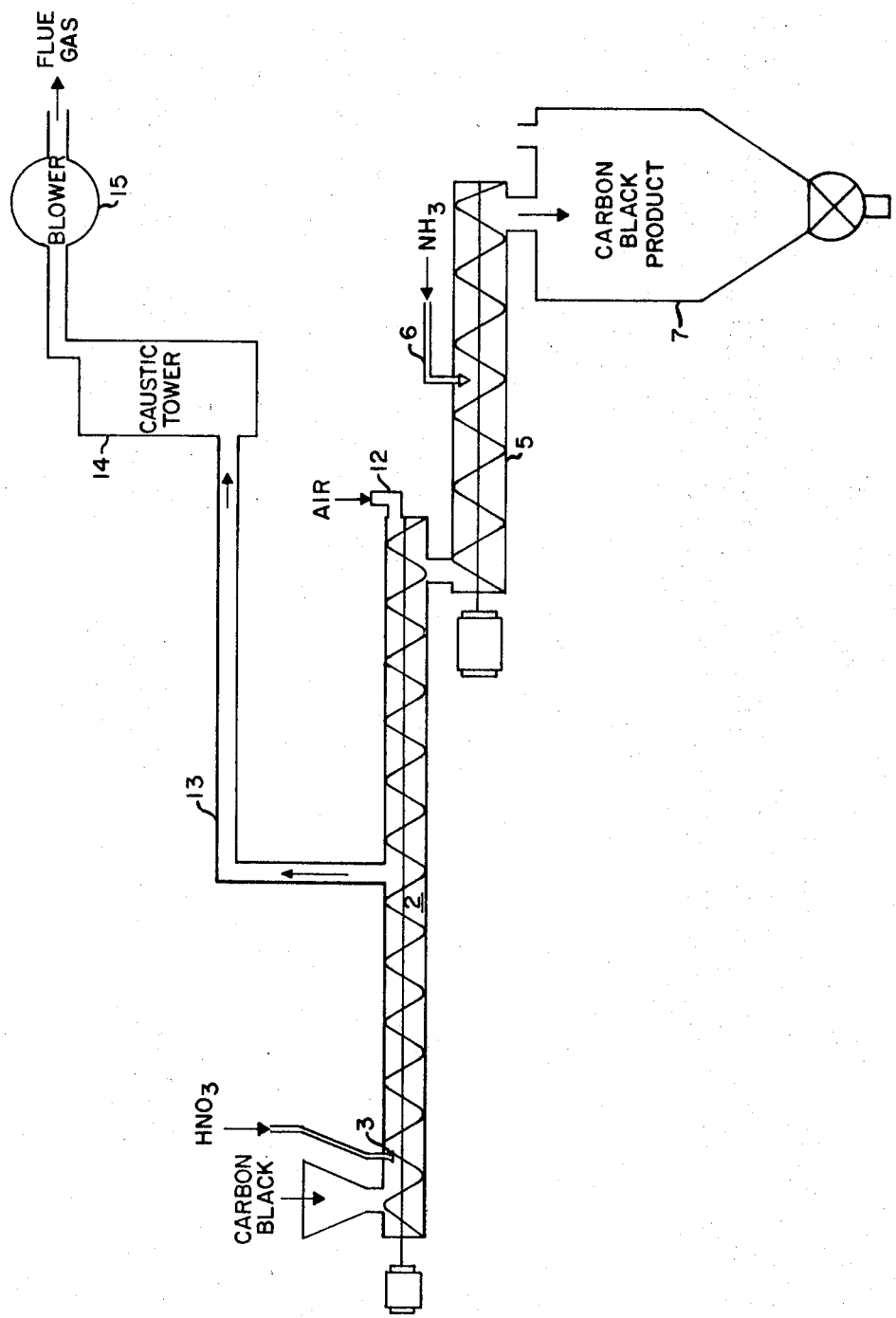

flow. The ink flow test comprises the production of a standard newsink containing a standard black and test newsinks each containing one of the sample blacks. Equivalent volumes of each of the inks are placed into the base cups of separate vertically oriented brass troughs and the troughs are then tipped through 130° to form a 40° angle with the horizontal thereby causing the ink samples to flow therewithin. Said angle is maintained until the leading edge of the standard ink sample has migrated precisely eight inches. Substantially immediately thereafter the troughs are tipped back to the horizontal position in order to arrest further flow of the samples. The lengths to which the test inks have flowed are then measured and the "flow" of the test samples is calculated in terms of percentage of flow of the standard sample. Thus, the following equation applies:

$$\text{"flow"} = \frac{\text{Length of test sample flow}}{\text{Length of standard flow} \times 100}$$

Table I below provides a tabulation of the results of each of the aforementioned tests.

TABLE I

| | Volatile percent | pH | Ink flow (percent of standard) |
|---|---|---|---|
| Control, Run 1 | 14.4 | 2.6 | 187 |
| Sample, Run 2 (heat+air purge) | 14.0 | 2.8 | 160 |
| Sample, Run 3 (NH₃ only) | 14.3 | 3.3 | 166 |
| Sample, Run 4 (heat+air purge+NH₃) | 14.0 | 3.3 | 158 |

Finally, samples of the blacks resulting from Runs 1–4 were placed in separate crucibles and heated to and maintained at about 400° F. Under these conditions a strong evolution of reddish brown nitric oxide was seen to emanate from Control, Run 1, and the odor of nitric oxide was strongly detectable from Sample, Run 2. The blacks of Sample, Runs 3 and 4, however, remained substantially odorfree.

EXAMPLE 2

Into a dryer of about one gallon volume capacity there was introduced about 1200 grams of a pelleted HAF oil furnace carbon black having a volatile content of about 1.0% and a pH of about 7.5. The dryer was thereafter set into operation and the temperature therein raised to about 250° F. by the application of external heat. Next, there was charged into the dryer about 12 grams of nitric acid vapors. The dryer was then continued in operation for an additional five minutes, shut down and cooled. The black was then removed and split into three 400 gram samples one of which samples was bottled and capped without further treatment (Sample 1). The interior of the dryer was thoroughly cleaned, heated to about 400° F. and one of the 400 gram samples, hereinafter referred to as Sample 2, recharged thereinto. An air purge of the dryer contents was achieved by introducing air through the dryer at a rate of about 15.0 liters/minute. After about four minutes of operation under these conditions the dryer was shut down, cooled and the Sample 2 removed therefrom.

Next, after cleaning, the dryer was recharged with another 400 gram sample (hereinafter referred to as Sample 3), heated to about 225° F. and there was charged thereinto about 16 milliliters of a concentrated NH₄OH solution which corresponds to a weight ratio of about 0.15 part NH₄OH per hundred parts of carbon black. About two minutes after the addition of the ammonia solution the dryer was shut down and cooled. The Sample 3 black product was then removed.

Each of the sample blacks was then tested for pH and volatile content in accordance with the ASTM procedures described in Example 1. Further, ASTM D–15 natural rubber test formulations were prepared utilizing each of the sample blacks and the resulting rubber batches were tested prior to curing for scorch quality by the Mooney Viscometric method (ASTM D–1646). Subsequent to curing the rubber formulations were tested for tensile properties (ASTM D–412). Table II below comprises a compilation of the data from each of the above test procedures:

TABLE II

| Black sample No. | pH | Volatile content, percent | Mooney scorch, $T_{10}$ at 250° F. | Tensile strength, p.s.i. | Modulus |
|---|---|---|---|---|---|
| 1 | 4.1 | 1.98 | 25 | 4,180 | 2,080 |
| 2 | 4.4 | 1.88 | 24.5 | 4,260 | 2,140 |
| 3 | 6.2 | 2.12 | 26 | 4,180 | 2,140 |

EXAMPLE 3

This example is essentially a duplicate of the procedure utilized in Example 2 with the following exceptions: the level of nitric acid treatment was raised substantially over that employed in Example 2; accordingly, the drum treater was charged with about 1250 grams of the carbon black pellets to be treated, heated to about 250° F. and there was injected into the drum in five equal increments 250 milliliters of 70% nitric acid solution. After each injection of the fifty milliliter nitric acid charge the drum treater was operated for between about two and about three minutes prior to the subsequent acid injection in order to ensure equal distribution of the reagent on the black. Accordingly, the total time to treat the black by this method was about 15 minutes. Next, the drum treater was shut down, cooled and the carbon black product divided into two equal portions of about 625 grams each. The treater was cleaned and recharged with one of collected black portions (Sample A) and thereafter heated to about 375° F. and the contents were continuously swept with an air purge as described in the previous example. After about 10 minutes of operations under the aforesaid conditions the dryer operations were terminated and the cooled black Sample A product collected.

The dryer was then cleaned and recharged with the remaining portion of the acid treated black (Sample B). In this run, the black was heated to and maintained at about 280° F. and there was injected into the dryer about 15 milliliters of concentrated NH₄OH solution. After about five minutes of operation following the injection of the ammonia solution the dryer was shut down, cooled and the product black collected therefrom.

As in Example 2, the sample blacks resulting from the above procedures were tested for pH and volatile content. In addition, natural rubber formulations were produced with each of the sample blacks and tested for scorch, tensile, modulus and dispersion quality. The dispersion quality test is performed by microtoming a 2–5 micron thick section from the center of a rubber sample and inspecting the sample microscopically. The quality of dispersion of the sample is compared to a series of standard micrographs and is predicated on a scale of 10 with 1 representing the poorest dispersion and 10 representing the optimum dispersion.

TABLE III

| | pH | Volatile | Mooney scorch | Tensile | Modulus | Dispersion |
|---|---|---|---|---|---|---|
| Sample A (purged) | 2.8 | 4.43 | 28.5 | 3,440 | 1,720 | 3 |
| Sample B (NH₄OH) | 5.0 | 4.50 | 32.5 | 4,080 | 1,860 | 9 |

It is believed that the substantially improved dispersion of the ammonia treated black represents still another important contribution and advantage available through the use of the process of the present invention, particularly with respect to carbon blacks which are treated comparatively heavily with oxidizing mineral acids. When the procedures of the instant example are repeated with the exception that the oxidizing mineral acids utilized are oleum in one instance and sulfur trioxide in another substantially the same results are achieved with respect to comparisons between those blacks which have undergone free acid residue removal steps by the procedures outlined above.

Obviously, many changes can be made in the above description and examples without departing from the intended scope of the invention. For instance, the carbon blacks to be treated in the manner of the present invention can also be partially air or ozone oxidized prior to the oxidizing mineral acid treating step. Further, the carbon blacks resulting from the acid treatment and free acid residue removal method of the present invention can be subsequently treated such as by pelletization, fluid energy milling, calcination, and the like in order to particularly befit them for various end item applications. Accordingly, it is intended that the above description and examples be construed as illustrative in nature and not restricting the scope of the invention beyond that established by the metes and bounds of the claims forming part thereof.

What is claimed is:

1. In a process for treating carbon black which comprises contacting carbon black with an oxidizing mineral acid at elevated temperature, the improvement which comprises removing free acid residue from said acid treated black by contact thereof with ammonia in an amount and under conditions sufficient to effect an elevation in the pH of the acid treated black of at least about 0.5 point.

2. The process of claim 1 wherein the amount of ammonia utilized and the conditions of contact thereof with said black result in (1) a rise in pH of said black of at least about 1.0 point, and (2) an endpoint pH of said black of between about 3.0 and about 7.0.

3. The process of claim 1 wherein the ammonia contacting step is carried out at a temperature greater than about 150° F.

4. The process of claim 1 wherein said carbon black is maintained in a substantially continuous state of agitation during said ammonia contact step.

5. The process of claim 1 wherein said contact is achieved with ammonia gas.

6. The process of claim 1 wherein said contact is achieved with ammonia in solution form.

7. The process of claim 1 wherein the oxidizing mineral acid utilized is in anhydrous form.

8. The process of claim 7 wherein said anhydrous form of the oxidizing mineral acid is chosen from the group consisting of oxides of nitrogen, sulfur or mixtures thereof.

9. The process of claim 1 wherein the oxidizing mineral acid utilized is chosen from the group consisting of nitric acid, sulfuric acid and mixtures thereof.

10. The process of claim 1 wherein said carbon black is in fluffy form.

11. The process of claim 1 wherein said carbon black is in pelleted form.

12. The process of claim 1 wherein subsequent to the acid treatment step and in addition to the ammonia contact step said black is desorbtively treated by heating thereof in an enclosed zone while substantially continuously sweeping said desorption zone with a gas.

References Cited

UNITED STATES PATENTS

| | | | |
|---|---|---|---|
| 2,178,382 | 10/1939 | Wiegand | 106—307 X |
| 2,178,383 | 10/1939 | Wiegand | 106—307 X |
| 2,643,182 | 6/1953 | Borger | 106—307 X |
| 2,816,046 | 12/1957 | Damusis | 106—307 |
| 3,152,996 | 10/1964 | Forrester | 106—307 X |
| 3,364,048 | 1/1968 | May et al. | 106—307 |

EDWARD J. MEROS, Primary Examiner

U.S. Cl. X.R.

23—209.1, 209.2